(12) United States Patent
Louzoun et al.

(10) Patent No.: US 9,280,367 B2
(45) Date of Patent: *Mar. 8, 2016

(54) TECHNIQUES FOR USING AN ASSIGNED SWITCH IDENTIFICATION AT AN INPUT/OUTPUT DEVICE

(71) Applicant: INTEL CORPORATION, Santa Clara, CA (US)

(72) Inventors: Eliel Louzoun, Jerusalem (IL); Izhar Hofshi, Habonim (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/592,774

(22) Filed: Jan. 8, 2015

(65) Prior Publication Data

US 2015/0120966 A1 Apr. 30, 2015

Related U.S. Application Data

(63) Continuation of application No. 13/839,606, filed on Mar. 15, 2013, now Pat. No. 8,954,620, which is a continuation of application No. PCT/US2012/031276, filed on Mar. 29, 2012.

(51) Int. Cl.
| | |
|---|---|
| *G06F 3/00* | (2006.01) |
| *G06F 21/00* | (2013.01) |
| *G06F 9/445* | (2006.01) |
| *G06F 9/44* | (2006.01) |
| *G06F 9/455* | (2006.01) |
| *H04L 12/931* | (2013.01) |

(52) U.S. Cl.
CPC .......... *G06F 9/44505* (2013.01); *G06F 9/4411* (2013.01); *G06F 9/45533* (2013.01); *H04L 49/70* (2013.01); *H04L 49/351* (2013.01)

(58) Field of Classification Search
CPC ................... G06F 9/45533; G06F 2009/45579
See application file for complete search history.

(56) References Cited

U.S. PATENT DOCUMENTS

| | | | | |
|---|---|---|---|---|
| 2004/0008722 | A1* | 1/2004 | Ellis et al. | 370/461 |
| 2005/0053060 | A1 | 3/2005 | Pettey | |
| 2009/0292858 | A1* | 11/2009 | Lambeth et al. | 711/6 |
| 2010/0214949 | A1* | 8/2010 | Smith et al. | 370/254 |
| 2011/0252248 | A1* | 10/2011 | Cameron et al. | 713/300 |
| 2013/0262711 | A1* | 10/2013 | Louzoun et al. | 710/9 |

OTHER PUBLICATIONS

Office Action received for Korean Patent Application No. 2014-7027286, mailed May 20, 2015, 12 pages including 6 pages English translation.

* cited by examiner

*Primary Examiner* — Hyun Nam
(74) *Attorney, Agent, or Firm* — Kacvinsky Daisak Bluni PLLC

(57) ABSTRACT

Examples are disclosed for assigning a switch identification to data received at an input/output device coupled to a host device. In some examples, the data may be associated with a virtual station interface (VSI) for a virtual machine implemented at the host device. For these examples, a switch identification may be assigned to the data based on identification information for the data or an originator of at least a portion of the identification information. The assigned switch identification may then be used as part of a lookup table to determine one or more actions for processing the data at the input/output device. Other examples are described and claimed.

34 Claims, 5 Drawing Sheets

Switch ID Structure 200

| Local/Global | Received Port # | Identification Information |
|---|---|---|
| 210 | 220 | 230 |

FIG. 2

Assigned Switch ID Table 300

| Virtual Switch | Assigned Switch ID | | |
|---|---|---|---|
| | Local/Global | Received Port # | Identification Information |
| 141 | 0 | 001 | 0x005 (Channel D ID #) |
| 143 (Channel A) | 1 | 001 | 0x002 (S-Tag A ID #) |
| 143 (Channel B) | 1 | 001 | 0x003 (S-Tag B ID #) |
| 146 | 1 | 010 | 0x004 (S-Tag C ID #) |
| 147 | 1 | 010 | 0x005 (S-Tag D ID #) |
| 148 | 1 | 011 | 0x006 (S-Tag E ID #) |
| 149 | 0 | 100 | Default Value of 0x000 |

FIG. 3

Lookup Table 400

| Assigned Switch ID | VSI Information | Action |
|---|---|---|
| 0x1005 | VLAN/MAC ID for VSI 111D | Route directly to VSI 111D |
| 0x1005 | VLAN/MAC ID for VSI 112D | Route directly to VSI 112D |
| 0x9002 | VLAN/MAC ID for VSI 113A | Cryptographic processing then route to VSI 113A |
| 0x9003 | VLAN/MAC ID for VSI 114B | Cryptographic processing then route to VSI 114B |
| 0xA004 | VLAN/MAC ID for VSI 115C | Packet Inspection then route to VSI 115C |
| 0xA005 | VLAN/MAC ID for VSI 116D | Packet Inspection then route to VSI 116D |
| 0xB006 | VLAN/MAC ID for VSI 117E | Packet Inspection then route to VSI 117E |
| 0xC000 | VLAN/MAC ID for VSI 118? | Route directly to VSI 118x |

FIG. 4

TECHNIQUES FOR USING AN ASSIGNED SWITCH IDENTIFICATION AT AN INPUT/OUTPUT DEVICE

CROSS-REFERENCE TO RELATED APPLICATIONS

This application is a continuation of, claims the benefit of, and priority to U.S. patent application Ser. No. 13/839,606 filed Mar. 15, 2013, and entitled "TECHNIQUES FOR USING AN ASSIGNED SWITCH IDENTIFICATION AT AN INPUT/OUTPUT DEVICE," which is a continuation of PCT/US2012/031276 filed Mar. 29, 2012; all of the above are incorporated by reference herein in their entirety.

BACKGROUND

An input/output (I/O) device such as a network interface card (NIC) may couple to a computing platform or host device deployed in server-network edge where the server domain ends and an external network domain begins. A known way to implement switch logic or circuitry at a NIC in these types of environments is through use of a set of lookup tables. The lookup tables may identify a portion of data such as a packet header and then actions may be defined in the lookup table based on the packet header. Lookup tables typically work well in a NIC implementing switch circuitry that connects all the ports via a single switch instance.

A proposed standard by the Institute of Electrical and Electronics Engineers (IEEE) describes implementing numerous switches as part of Edge Virtual Bridging (EVB). The proposed standard has the title of "IEEE Standard for Local and Metropolitan Area Networks—Virtual Bridged Local Area Networks—Amendment Edge Virtual Bridging" and identified as IEEE 802.1Qbg, draft 2.1, published Jan. 30, 2012 (hereinafter "IEEE 802.1Qbg"). A NIC operating in accordance with IEEE 802.Qbg may need to implement separate dedicated switch instances for each logical or virtual port associated with an Ethernet port. Also, the NIC may need to implement additional local switch instances for internal traffic between processing elements at a host device that may include virtual machines (VMs). Further, cascaded switch instances may be needed to implement a Virtual Ethernet Bridge (VEB) or a Virtual Ethernet Port Aggregator (VEPA) within a single Ethernet port. For these multiple switch instances using separate lookup tables for each switch instance may require a substantial amount of NIC resources.

BRIEF DESCRIPTION OF THE DRAWINGS

FIG. 2 illustrates an example switch identification structure.

FIG. 3 illustrates an example assigned switch identification table.

FIG. 4 illustrates an example lookup table.

DETAILED DESCRIPTION

As contemplated in the present disclosure, multiple switch instances when implementing EVB may require a substantial amount of NIC resources when using separate lookup tables for each switch instance. Also, switch instances in a virtual switching environment may be associated with dynamic configurations. As a result of the dynamic configurations, assigning a separate lookup table for each possible switch instance may require too may resources and may also restrict possible configurations as a given NIC has limited resources to support these separate lookup tables.

In some examples, techniques are implemented for assigning a switch identification to data received at an input/output device coupled to a host device. For these examples, the data may be associated with a virtual station interface (VSI) maintained at the I/O device, the VSI may be communicatively coupled to a virtual machine implemented at the host device. For these examples, the data may have been sent from one of the virtual machine or a network element capable of being coupled to the I/O device via a network communication link. A switch identification may be assigned to the data based on an assigned port identifier for a port through which the data is received at the I/O device, identification information for the data, and an originator of at least a portion of the identification information. The assigned switch identification may be used as part of a lookup table to determine one or more actions for processing the data at the I/O device.

Figure 1:
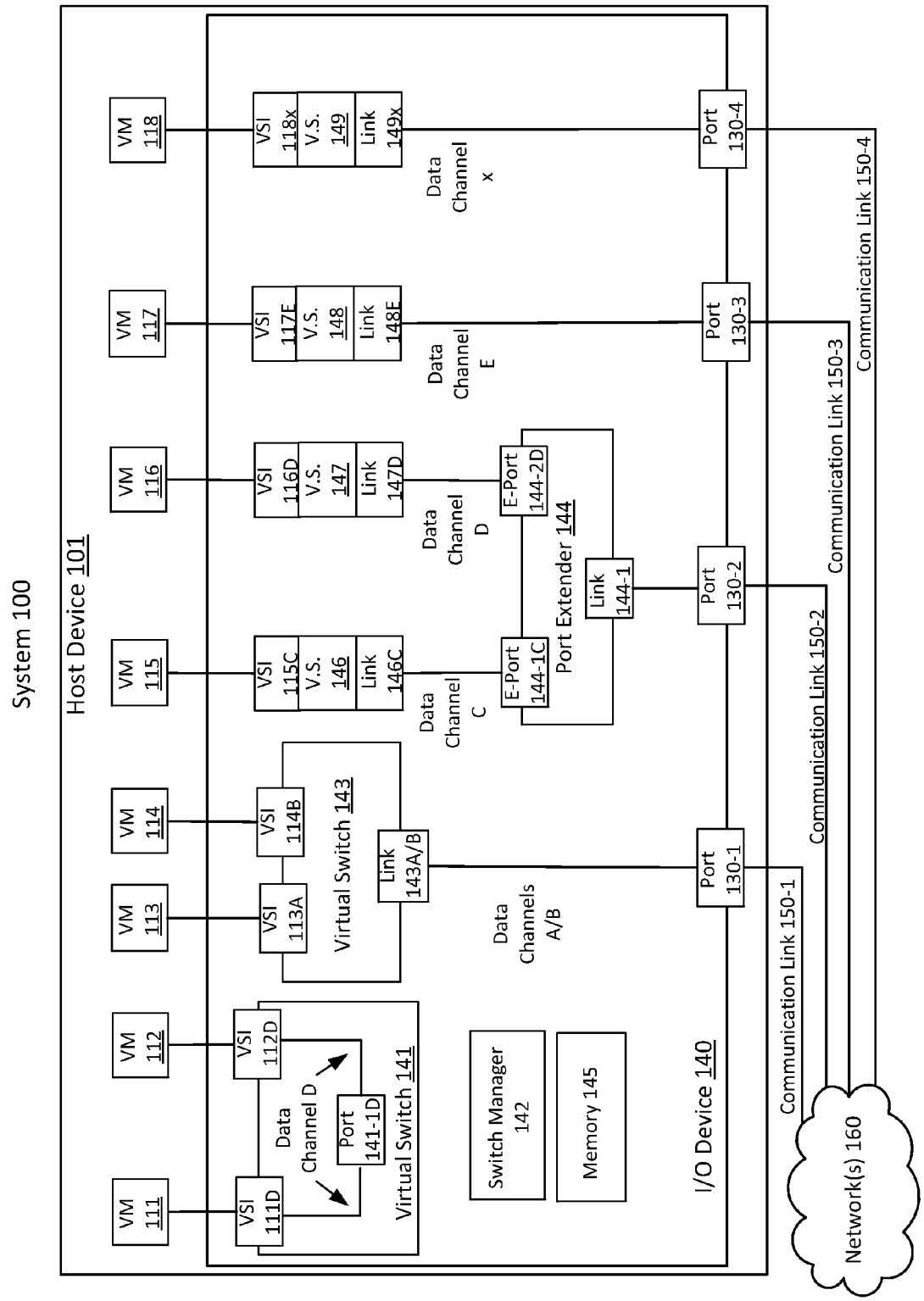
FIG. 1 illustrates an example system.

FIG. 1 illustrates an example first system. The example first system, as shown in FIG. 1, includes a system 100. System 100 may include a host device 101 coupled to input/output (I/O) device 140. As shown in FIG. 1, I/O device 140 may be coupled to host device 101 through various virtual station interfaces (VSIs) 111D, 112D, 113A, 114B, 115C, 116D, 117E and 118x ('x' indicates association with a yet to be established data channel) included in virtual switches (V.S.) 141, 143, 146, 147, 148, and 149. The various VSIs included with these virtual switches may be separately arranged to couple to virtual machines (VMs) 111-118 as shown in FIG. 1 and may enable data (e.g., in the form of data packets or data frames) to be received from or sent/transmitted to VMs 111-118. For these examples, VMs 111-118 may be configured or arranged to be implemented using computing resources maintained at host device 101. Any number of virtual switches may be associated with any number of VSIs to communicatively couple to any number of VMs and/or virtual machine managers (hypervisors).

According to some examples, as shown in FIG. 1, a logical port (L-port) 141-D is shown as included in virtual switch 141. L-port 141-D may server as a logical port capable of being coupled to a data channel D. As mentioned more below, data channel D may be arranged to route data between VM 111 and VM 112. The routing of the data, for example, may be through respective VSIs 111 and 112 as shown in FIG. 1.

Also, as shown in FIG. 1, communication links 150-1 to 150-4 may couple network elements included in network(s) 160 to host device 101 via respective ports 130-1 to 130-4. In some examples, ports 130-1 to 130-4 may represent a physical connector or port via which data (e.g., in the form of data packets or frames) may be received at or sent/transmitted from I/O device 140. I/O device 140 is also shown as including a port extender 144. According to some examples, as shown in FIG. 1, port extender 144 may include E-port 144-1C and E-port 144-2D. For these examples, port extender 144 may enable physical port 103-2 to be extended to at least two extender/logical ports to route data to/from virtual switches 146 and 147 via E-port 144-1C and E-port 144-2D.

In some examples, as shown in FIG. 1, I/O device 140 includes a switch manager 142. As described more below, switch manager 142 may include logic and/or features to assign a switch identification to data received at I/O device 140. For these examples, the data may be received at a port from among various ports depicted in FIG. 1. The assigned switch identifications may then be used as part of a lookup table to determine one or more actions for processing the data at I/O device 140 (e.g., forwarding, cryptographic/security processing, etc.).

According to some examples, I/O device 140 may be configured to operate in accordance with or implement at least some aspects of a proposed IEEE standard (including progenies and variants) having the title of "Standard for Local and Metropolitan Area Networks—Virtual Bridged Local Area Networks—Bridge Port Extension" and identified as IEEE 802.1BR, draft 3.2, published Jan. 25, 2012 (hereinafter "IEEE 802.1BR"). For these examples, I/O device 140 may also be configured to operate in compliance with or implement at least some aspects of the proposed IEEE 802.1Qbg standard (including progenies and variants). As part of the implementation of IEEE 802.1Qbg or IEEE 802.1BR, various data channels may be established for routing data either locally between virtual machines on host device 101 or globally to network elements located at network(s) 160.

In some examples, as shown in FIG. 1, various established data channels are identified as data channels A-E. For these examples, the various VSIs coupled to VMs 111 to 116 are associated with data channels A, B, C, D or E with the exception of VSI 118x coupled to virtual machine 118. VSI 118x, in some examples, may represent a VSI yet to be associated with an established data channel. As mentioned more below, data routed through VSI 118x may include control information used to eventually establish a data channel with VSI 118x. For these instances a default identification or tag for this control data may be locally generated or originated at I/O device 140 and then used to assign a switch identification to the data.

According to some examples, data channels may be used to either route data between VMs located at host device 101 or to route data to between VMs and network elements located at network(s) 160. For these example, identification information for the data routed via these data channels may include a tag described in IEEE 802.1Qbg or IEEE 802.1BR. The tag may be a Service tag (S-tag) or a Bridge Port Extension tag (E-tag). In some examples, the S-tag or E-tag may be identification information to indicate that data having one of these tags may be associated with a given channel. These tags may be globally generated or originated from elements remote to I/O device 140 such as network elements at network(s) 160.

In some examples, switch manager 142 may include logic and/or features arranged to receive data at I/O device 140. The data may be associated with a VSI and may have identification information (e.g., an S-tag or E-tag) to indicate an association with channel A. As shown in FIG. 1, a VSI coupled to or associated with channel A may be VSI 113A. For these examples, VSI 113A may be arranged or configurable to couple to VM 113 and also arranged to route data from VM 113 through virtual switch 143. According to some examples, since the data is routed via a data channel coupled to network(s) 160, the data may considered as being received at the physical port 130-1 coupled to channel A. Switch manager 142 may include logic and/or features arranged or configured to assign a switch identification number to the data based on the identifier assigned to port 130-1, identification information for the data (e.g., tag information), and the originator of at least a portion of the identification information. The switch identification information may then be used by logic and/or features of switch manager 142 as part of a lookup table to determine one or more actions for processing the data at I/O device 140.

In some other examples, data having identification information to indicate an association to channel A may be received at I/O device 140 via port 130-1. The data received through port 130-1 may then be routed via channel A to virtual switch 143. As mentioned previously, VSI 113A may couple to VM 113. For these examples, VSI 113A may be arranged to cause the data to be sent or transmitted to VM 113. For these other examples, switch manager 142 may include logic and/or features arranged or configured to assign a switch identification number to the data based on an identifier assigned to the I/O device 140 receiving port (port 130-1), identification information for the data, and the originator of at least a portion of the identification information. The switch identification information may then be used by logic and/or features of switch manager 142 as part of a lookup table to determine one or more actions for processing the data at I/O device 140.

In some examples, data may be received at a port included in I/O device 140 that may be routed between VMs 111 and 112 via data channel D at virtual switch 141. Data received at L-port 141-1D through VSI 111D from VM 111 may have a destination of VM 112. For these examples, identification information for the data received at port 141-1D may include a data channel identification number originated at I/O device 140 (e.g., at virtual switch 141). The data channel D identification number may be similar to the format of an S-tag or E-tag. Switch manager 142 may include logic and/or features arranged or configured to assign a switch identification number to the data based on an identifier assigned to the port 141-1D, the locally generated channel D identification number, and an indication that the originator of at least a portion of the identification information was at I/O device 140. The switch identification information may then be used by logic and/or features of switch manager 142 as part of a lookup table to determine one or more actions for processing the data at the I/O device 140.

In some examples, virtual switch 141 may be configured to operate in accordance with IEEE 802.1Qbg and function as a Virtual Ethernet Bridge (VEB).

In some examples, communication links 150-1 to 150-4 may communicatively couple I/O device 140 to network(s) 160 via ports 130-1 to 130-4, respectively. Communication links 150-1 to 150-4 may include various types of wired, wireless or optical communication mediums. For these examples, communication links 150-1 to 150-4 may be operated in accordance with one or more applicable communication or networking standards in any version. The communication or networking standards may include, but are not limited to, IEEE 802.1Qbg or IEEE 802.1BR.

FIG. 2 illustrates an example switch identification structure 200. In some examples, switch manager 142 may include logic and/or features to use switch identification structure 200 to assign a switch identification to data received at I/O device 140. As shown in FIG. 2, switch identification structure includes fields 210, 220 and 230. In some examples, field 210 may indicate an originator for a least a portion of identification information for the data. Field 220 may indicate an assigned port identifier for a port through which the data may be received at I/O device 140. Field 230 may indicate the identification information for the data. The identification information for the data may include data channel identification numbers such as S-tags, E-tags or locally generated/originated default information.

According to some examples, a local originator of the identification information may be indicated in switch ID structure 200 by a 1-bit binary value of 0 and global originator may be indicated by a 1-bit value of 1 in field 210. Also, received port # in field 220 may be indicated by a 3-bit value. So, for example, an assigned identifier of "4" would be indicated by a 3-bit binary value of 100 and an assigned identifier of "2" would be indicated by a 3-bit binary value of 010. This disclosure is not limited to 1-bit or 3-bit binary values for fields 210 or 220, respectively.

In some examples, identification information for data included in field 230 may include data channel identification numbers ranging from 1 to 4096. Also S-tag or E-tag information may include identification numbers ranging from 1 to 4096. These identification numbers may be represented in field 230 as either a 12-bit binary value or a 3-character hexadecimal value. This disclosure is not limited to 12-bit binary or 3-character hexadecimal value for field 230 or to numbers ranging from 1 to 4096.

FIG. 3 illustrates an example assigned switch identification table 300. In some examples, assigned switch ID table 300 depicts how values associated with switch ID structure 200 may be used to assign switch identifications to data. For these examples, the assigned switch ID table 300 may be at least stored in a memory maintained at I/O device 140 (e.g., memory 145). The various virtual switches of I/O device 140 are listed in the left column of assigned switch identification table 300 and assigned switch identifications for received data are listed in the right three columns According to some examples, switch manager 142 may include logic and/or features configured or arranged to assign a switch identification to data based on an assigned port identifier for a port through which the data was received, identification information for the data (tag or default value), and an originator of at least a portion of the identification information (local or global). For example, virtual switch 141 was mentioned above as generating identification information for data routed between VMs 111 and 112. Thus, a value of 0 is indicated in the "Local/Global" column for virtual switch 141. Also, in some examples, the L-port 141-1D of virtual switch 141 may have assigned a port number of 1 and this port number for virtual switch 141 is shown in table 300 as having a binary value of 001. Further, data may be forwarded between the VSIs coupled to virtual switch 141 through data channel D. For this example, a data channel identification associated with data channel D may have a hexadecimal value of 0x005 and this value is shown in FIG. 3 in the "Identification Information" column In some examples, as mentioned above for FIG. 1, virtual switches 143 and 146 to 148 may be configured to receive data having identification information generated or originated remotely to I/O device 140. Thus a value of 1 is indicated in the "Local/Global" column for virtual switches 143 and 146-148. For these virtual switches the data received from network(s) 160 may be received through ports 130-1 to 130-3.

These three ports may be assigned port numbers of 1-3, from left to right (see FIG. 1) and these port numbers are shown in table 300 as having binary values of 001, 010 and 011, respectively. Further, data may be forwarded to or routed through the VSIs coupled to these virtual switches through one of data channels A-E. According to some examples, an S-tag may be associated with data received via data channels A-E. An S-tag received via data channels A-E may have an identification number with a hexadecimal value of 0x002, 0x003, 0x004, 0x005, and 0x006, respectively.

In some examples, virtual switch 149 may be configured to receive data via an unassigned data channel x coupled to port 130-4. Since the data channel does not have an assigned data number, the originator of the identification information for data received via channel x is deemed as local and a value of 1 is indicated in the "Local/Global" column for virtual switch 149. As shown in FIG. 1, port 130-4 may be the fourth port coupled to network(s) 160. According to some examples, port 130-4 may be assigned a port number of 4 having a binary value of 100 as indicated in the "Received Port #" column Also a default hexadecimal value of 0x000 is indicated in the "Identification Information" column shows that the data received at virtual switch 149 may not yet be associated with or assigned a data channel identification number.

According to some examples, as shown in table 300, the data channel identification number for data channel D at virtual switch 141 and the data channel D at virtual switch 147 are both 0x005. However, since the data channel identifier for data channel D at virtual switch 141 was from a local originator, the assigned switch identification is different due to the local identifier having a value of 0 compared to the global identifier having a value of 1 for data channel D at virtual switch 147.

FIG. 4 illustrates an example lookup table 400. As shown in FIG. 4, lookup table 400 includes columns for assigned switch identifications, VSI identifications and associated actions. According to some examples, the assigned switch identifications may have been based on the assigned switch ID table 300 as described above for FIG. 3. For these examples, the 1-bit and 3-bit binary values in the "Local/Global" and "Received Port #" columns may be combined to form a 4-bit binary value and that 4-bit binary value may then be converted to a 1-character hexadecimal value. The 1-character hexadecimal value may then be added as a $4^{th}$ character to the 3-character data characteristic value shown in the "Identification Information" column of assigned switch ID table 300. As a result of these combinations, a given assigned switch identification may have a 4-character hexadecimal value as shown in lookup table 400. For example, data having a global originator for identification information and received at port 3 of I/O device 140 would have a 4-bit binary value of 1011 and this value converts to a hexadecimal value of B (or a decimal value of 11).

According to some examples, as shown in FIG. 4, lookup table 400 may include a "VSI information" column to indicate identification information to include a virtual local area network (VLAN)/media access controller (MAC) ID. For these examples, the VLAN/MAC ID information may be used along with the assigned switch ID to further determine what actions to take for data received at I/O device 140.

In some examples, as shown in FIG. 4, received data may be assigned the 4-character switch identification numbers and switch manager 142 may include logic and/or features configured or arranged to use the assigned switch identifications as part of lookup table 400 and possibly VLAN/MAC ID information in order to determine an action for data received through a given port at I/O device 140.

According to some examples, switch manager 142 maintained at I/O device 140 may include logic and/or features to at least temporarily store lookup table 400 at memory 145. For these examples, at least portions of memory 145 may be arranged or configured as ternary content-addressable memory (TCAM). Data received at I/O device 140 and assigned a given switch identification may be quickly associated with its respective assigned switch identification and a corresponding processing actions may be quickly determined using that assigned switch identification based on what is indicated in lookup table 400.

In some examples, as shown in FIG. 4 for lookup table 400, actions for processing data assigned a given switch identification may include routing the data directly to a given port. For example, data having an assigned switch identification of 0x1005 may be routed directly to VSI 111D. This data may then be transmitted/sent from VSI 111D to VM 112.

According to some examples, as shown in FIG. 4 for lookup table 400, actions for processing data assigned a given switch identification may include elements of I/O device 140 (e.g., a cryptographic processor circuit) performing cryptographic processing of the data and then routing the data to a given port. For example, data having an assigned switch identification of 0x9002 may be forwarded to a cryptographic processor circuit for encryption/decryption and then routed to VSI 113A. The data may then be transmitted/sent from VSI 113A to VM 113.

In some examples, as shown in FIG. 4 for lookup table 400, actions for processing data assigned a given switch identification may include elements of I/O device 140 (e.g., a security processor circuit) performing packet/frame inspection processing of the data and then routing the data to a given port. For example, data having an assigned switch identification of 0xA005 may be forwarded to a security processor circuit for packet/frame inspection and then routed to port 143-1A. The data may then be transmitted/sent from VSI 115D to VM 115.

Figure 5:
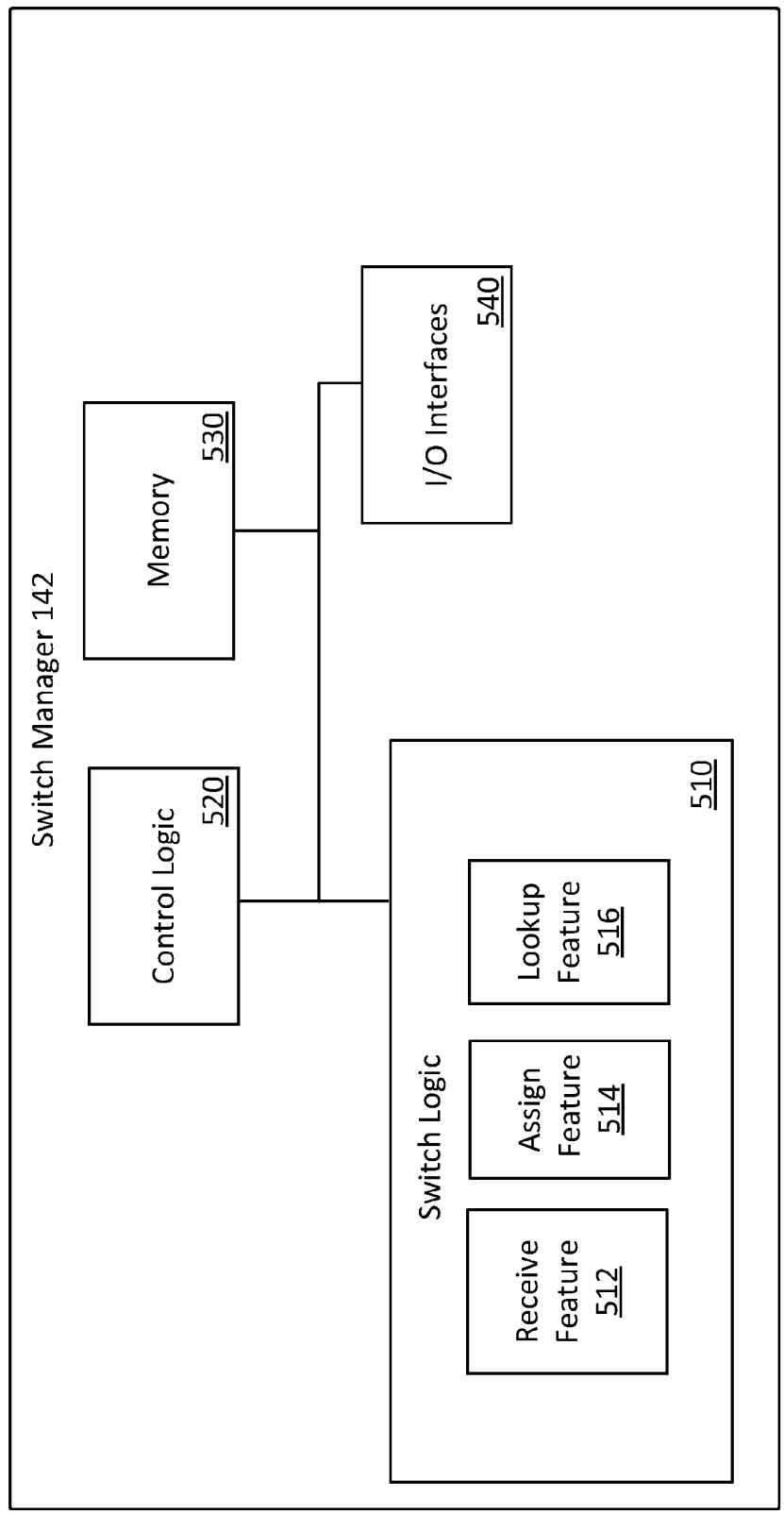
FIG. 5 illustrates a block diagram of an example architecture for a switch manager.

FIG. 5 illustrates a block diagram of an example architecture for a switch manager 142. In some examples, switch manager 142 includes features and/or logic configured or arranged for assigning a switch identification to data received at an I/O device coupled to a host device. According to some examples, as shown in FIG. 5, switch manager 142 includes a switch logic 510, a control logic 520, a memory 530 and input/output (I/O) interfaces 540. As illustrated in FIG. 5, switch logic 510 may be coupled to control logic 520, memory 530 and I/O interfaces 540. Switch logic 510 may include one or more of a receive feature 512, an assign feature 514, or a lookup feature 516, or any reasonable combination thereof.

In some examples, the elements portrayed in FIG. 5 are configured to support or enable switch manager 142 as described elsewhere in this disclosure. A given switch manager 142 may include some, all or more elements than those depicted in FIG. 5. For example, switch logic 510 and control logic 520 may separately or collectively represent a wide variety of logic device(s) or executable content to implement the features of switch manager 142. Example logic devices may include one or more of a processor circuit, a microprocessor, a microcontroller, a processor circuit, a field programmable gate array (FPGA), an application specific integrated circuit (ASIC), a sequestered thread or a core of a multi-core/multi-threaded microprocessor, a cryptography block, an off-load processor or a combination thereof.

In some examples, as shown in FIG. 5, switch logic 510 includes receive feature 512, assign feature 514 or lookup feature 516. Switch logic 510 may be configured to use one or more of these features to perform operations. For example, receive feature 512 may assist a I/O device in receiving data. Assign feature 514 may assign a switch identification number based on an assigned port identifier for a port through which the data was received at the I/O device, identification information for the data, and an originator of at least a portion of the identification information. Lookup feature 516 may use the assigned switch identification as part of a lookup table to determine one or more actions for processing the data at the I/O device.

In some examples, control logic 520 may be configured to control the overall operation of switch manager 142. As mentioned above, control logic 520 may represent any of a wide variety of logic device(s) or executable content. For some examples, control logic 520 may be configured to operate in conjunction with executable content or instructions to implement the control of switch manager 142. In some alternate examples, the features and functionality of control logic 520 may be implemented within switch logic 510.

According to some examples, memory 530 may be arranged to store executable content or instructions for use by control logic 520 and/or switch logic 510. The executable content or instructions may be used to implement or activate features, elements or logic of switch manager 142. As described more below, memory 530 may also be arranged to at least temporarily maintain information associated with assigning switch identification numbers to data received at an I/O device coupled to a host device.

Memory 530 may include a wide variety of non-volatile memory media including, but not limited to, one or more types of flash memory, programmable variables or states, read-only memory (ROM), random access memory (RAM), or other static or dynamic storage media.

In some examples, I/O interfaces 540 may provide an interface via a local communication medium or link between switch manager 142 and elements of an I/O device or elements of a host device. I/O interfaces 540 may include interfaces that operate according to various communication protocols or standards to communicate over the local communication medium or link. These communication protocols or standards may be described in one or more industry standards (including progenies and variants) such as those associated with the Inter-Integrated Circuit (EC) specification, the System Management Bus (SMBus) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

According to some examples, I/O interfaces 540 may provide an interface via a network communication link or channel between switch manager 142 and elements located at a computing device coupled to an I/O device and/or network elements associated with a communication link coupled to the I/O device. I/O interfaces 540 may include interfaces that operate according to various communication protocols or standards to communicate over the network communication link or channel. These communication protocols or standards may be described in Ethernet-related standards or specifications (including progenies and variants) such as those associated with IEEE 802.1Qbg or IEEE 802.1BR. This disclosure is not limited to only these Ethernet-related standards.

Figure 6:
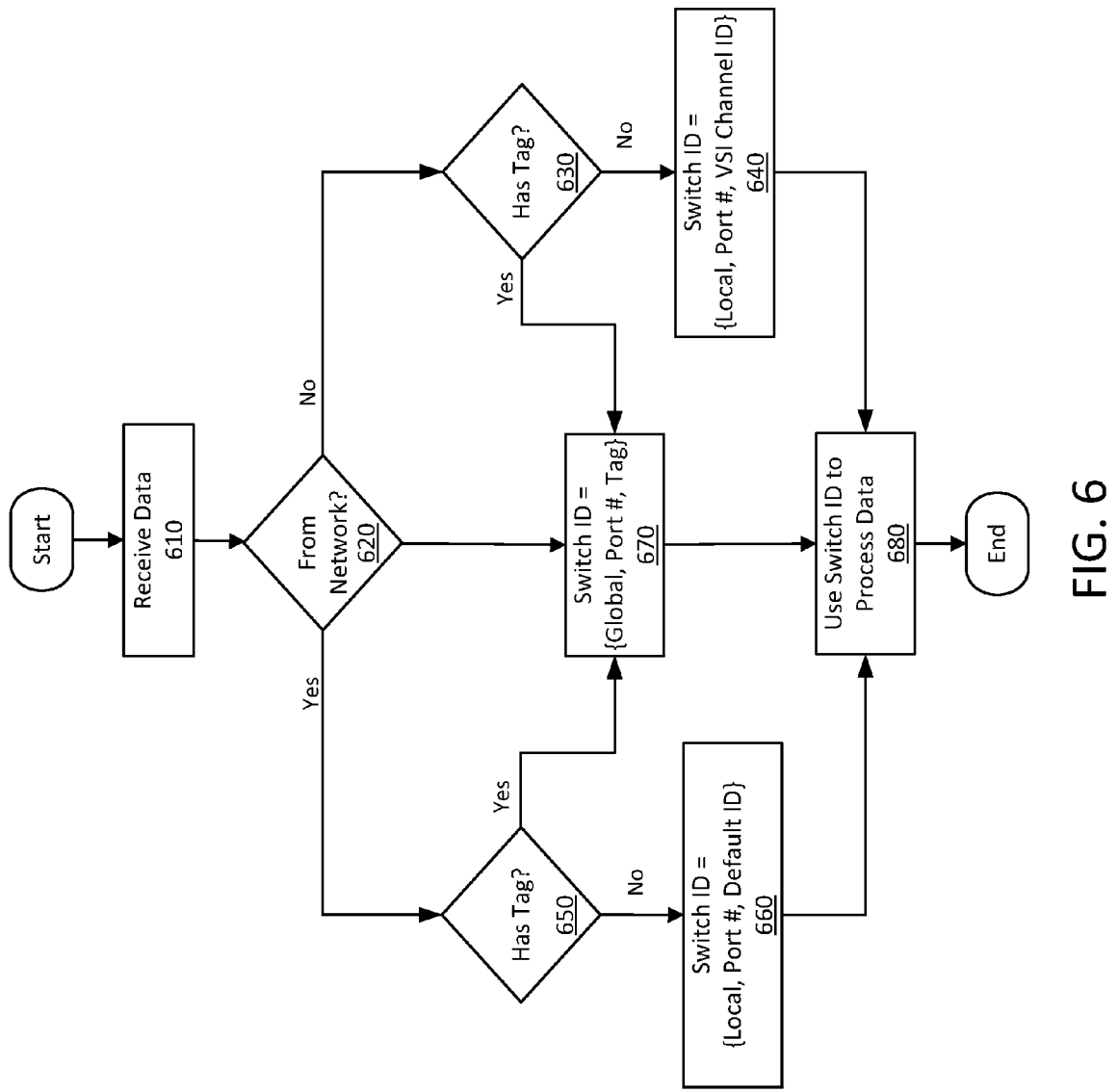
FIG. 6 illustrates an example flow diagram for assigning a switch identification.

FIG. 6 illustrates an example flow diagram for assigning a switch identification. In some examples, elements of system 100 as shown in FIG. 1 may be used to illustrate example operations related to the flow diagram depicted in FIG. 6. Switch manager 142 as shown in FIGS. 1 or FIG. 5 may also be used to illustrate the example operations. But the described example operations are not limited to implementations on system 100 or to switch manager 142 as described above for FIG. 1 or 5.

Switch ID structure 200, assigned switch ID table 300 and lookup table 400 as shown in FIGS. 2-4 may also be used to illustrate the example operations related to the flow diagram depicted in FIG. 6. But the described example operations are not limited to these particular structures or tables as shown in FIGS. 2-4.

Moving from the start to block 610 (Receive Data), switch manager 142 may include logic and/or features arranged to assist I/O device 140 in receiving data (e.g., via receive feature 512). In some examples, the data may be in a format of a data packet or frame and have a destination associated with one or more virtual machines at host device 101 or with one or more network elements at network(s) 160.

Proceeding from block 610 to decision block 620 (From Network?), switch manager 142 may include logic and/or features arranged to determine whether the data was received through either ports 130-1 to 130-4 coupled to communication links 150-1 to 150-4 or at the L-port 141-1D included in virtual switch 141 (e.g., via receive feature 512). In some examples, the data may have been received from VM 111 or VM 112 through L-port 141-1D included in virtual switch 141. For these examples, the process moves to decision block 630. In other examples, the data may have been received from a network element located with or at network(s) 160. For these other examples, the process moves to decision block 650.

Moving from decision block 620 to decision block 630 (Has Tag?), switch manager 142 may include logic and/or features arranged to determine whether the received data includes identification information such as an S-tag or an E-tag (e.g., via assign feature 514). In some examples, a data packet header associated with the data may not include identification information to identify an association with a data channel. For these examples, the process moves to block 640. Otherwise, if the received data includes identification information, the process moves to block 670.

Moving from decision block 630 to block 640 (Switch ID={Local, Port#, VSI Channel ID}), switch manager 142 may include logic and/or features arranged to assign a switch identification to the data (e.g., via assign feature 514). In some examples, since the data did not include identification information, the originator of the identification information would be local. The port # would be the assigned identifier for L-port 141-1D included in virtual switch 141. The VSI channel ID may be a channel identification number assigned by switch manager 142 that may be in a similar format as an S-tag or E-tag.

Moving from decision block 620 to decision block 650 (Has Tag?), similar to decision block 630, switch manager 142 may determine whether the received data includes identification information such as an S-tag or an E-tag. In some examples, a data packet header associated with the data may not include identification information to identify an association with a data channel. For these examples, the process moves to block 660. Otherwise, if the received data includes identification information, the process moves to block 670.

Moving from decision block 650 to block 660 (Switch ID={Local, Port#, Default ID}), switch manager 142 may include logic and/or features arranged to assign a switch identification to the data (e.g., via assign feature 514). In some examples, similar to block 640, since the data did not include identification information, the originator of the identification information would be local. The port # may be the assigned identifier for the port coupled to one of communication links 150-1 to 150-4 (e.g., port #4) via which the data was received from the network. The default ID may be a default channel identification number assigned by switch manager 142 that may be in a similar format as an S-tag or E-tag.

Moving from decision block 630 or decision block 650 to block 670 (Switch ID ={Global, Port#, Tag}), switch manager 142 may include logic and/or features configured to assign a switch identification to the data (e.g., via assign feature 514). In some examples, identification information for the data may have originated outside of or remote to I/O device 140 and hence is deemed as global. The port # may be the assigned identifier for the port coupled to one of communication links 150-1 to 150-4 (e.g., port #2) via which the data was received from the network. Also, the tag may be the identification information for the data and may be in a similar format as an S-tag or E-tag.

Moving from blocks 640, 660 or 670 to block 680 (Use Switch ID to Process Data), switch manager 142 may include logic and/or features to use the switch identification number assigned to the data and may also use VSI ID information (VLAN/MAC IDs) to determine one or more actions for processing the data at I/O device 140 (e.g., via lookup feature 516). In some examples, the action identified in lookup table 400 for the corresponding switch identification number may be used to determine the one or more actions for the data. As mentioned above, the one or more actions may include routing the data, cryptographic processing of the data or packet inspection processing of the data. The process then comes to an end.

Figure 7:
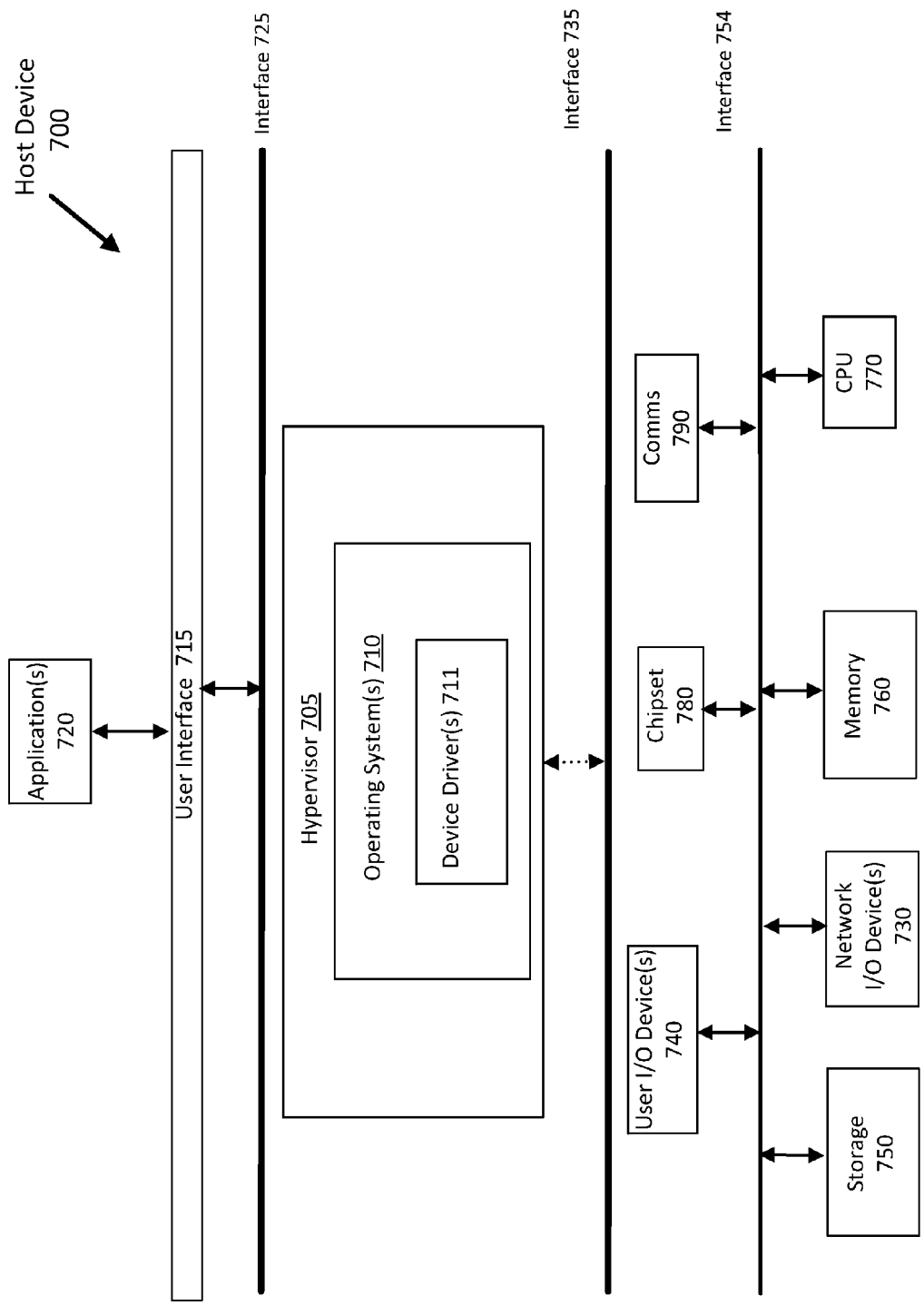
FIG. 7 illustrates an example system diagram for a host device.

FIG. 7 illustrates an example system diagram for a host device 700. As shown in FIG. 7, host device 700 includes hypervisor 705, operating system(s) 710, application(s) 720, network input/output (I/O) device(s) 730, user input/output (I/O) device(s) 740, a storage 750, a memory 760, a central processing unit (CPU) 770, a chipset 780, and communications (Comms) 790. According to some examples, several interfaces are also depicted in FIG. 7 for interconnecting and/or communicatively coupling elements of host device 700. For example, user interface 715 and interface 735 may allow for users (not shown) and/or application(s) 720 to couple to operating system(s) 710 and/or hypervisor 705. Also, interface 735 may allow for elements of hypervisor 705 and/or operating system(s) 710 (e.g., device driver(s) 711) to communicatively couple to elements of host device 700 such as network I/O device(s) 730, user I/O device(s) 740, storage 750, memory 760, CPU 770, chipset 780 or comms 790. Interface 754, for example, may allow hardware and/or firmware elements of host device 700 to communicatively couple together, e.g., via a system bus or other type of internal communication channel.

In some examples, as shown in FIG. 7, host device 700 may include operating system(s) 710. Operating system(s) 710, for example, may include one or more operating systems. Separate operating systems included in operating systems(s) 710 may be implemented as part of separate virtual machines supported by elements of host device 700. For these examples, the separate virtual machines may be associated with one or more processors included in CPU 770. Also, for these examples, hypervisor 705 may serve as a virtual machine manager for these separate virtual machines.

According to some examples, as shown in FIG. 7, operating system(s) 710 may separately include device driver(s) 711. Device driver(s) 711 may include logic and/or features configured to interact with hardware/firmware type elements of host device 700 (e.g., via interface 735). For example, device driver(s) 711 may include device drivers to control or direct storage 750 or memory 760 to fulfill requests made by application(s) 720 or operating system(s) 710. Device driver(s) 711 may also include device drivers to allow network I/O device(s) 730 to interact with CPU 770 and memory 760 to receive/forward data via communication channels coupled to host device 700 (e.g., via network I/O device(s) 730 or comm 790).

In some examples, application(s) 720 may include applications that may be implemented on host device 700. For these examples, applications(s) 720 may request access (e.g., through operating system(s) 710) or use of elements of system such as user I/O devices 740, storage 750 or memory 760.

According to some examples, network I/O device(s) 730 may be similar to I/O device 140 described above for FIG. 1.

For these examples, network I/O device(s) 730 may include an switch manager 142 (not shown in FIG. 7) having logic and/or features configured or arranged for assigning a switch identification to data received at network I/O device(s) 730. In some examples, network I/O device(s) 730 may be arranged to function as a network interface card (NIC).

In some examples, user I/O device(s) 740 may include one or more user input devices coupled to interface 754 for entering data and commands to be implemented by elements of host device 700. For example, the user input devices may include a keyboard, mouse, touch screen, track pad, track ball, isopoint, a voice recognition system, and/or the like. Similarly, user I/O device(s) 740 may include one or more user output devices coupled to interface 754 for outputting information to an operator or user. For example, the user output devices may include one or more displays, printers, speakers, and/or other output devices, if desired. For example, one of the user output devices may be a display. The display may be a cathode ray tube (CRTs), liquid crystal displays (LCDs), or any other type of display.

In some examples, storage 750 may include various types of memory configured to be implemented or operated in a storage mode of operation. Storage 750 may include at least one or a combination of different types of storage devices to store relatively large amounts of data. These different types of storage devices may include, but are not limited to, one or more of a magnetic disk drive, an optical disk drive, a tape drive, an internal storage device, an attached storage device, flash memory, battery backed-up SDRAM (synchronous DRAM), a network accessible storage device, and/or other types of non-volatile memory (e.g., phase change memory (PCM)). In some examples, storage 750 may be included as part of user I/O devices 730 rather than a separate element as depicted in FIG. 7.

According to some examples, memory 760 may include at least one or a combination of different types of memory to include RAM, DRAM, static RAM (SRAM), phase change material RAM (PRAM), and/or other types of volatile memory. In some examples, memory 760 may be configured to maintain buffers used by network I/O device(s) 730, elements of CPU 770 and/or operating system(s) 710 to at least temporarily store received data.

According to some examples, CPU 770 may be implemented as a central processing unit for host device 700. CPU 770 may include one or more processors separately having one or more processor cores. In some examples, CPU 770 may include any type of processor, such as, for example, a multi-core processor, a reduced instruction set computer (RISC), a processor having a pipeline, a complex instruction set computer (CISC), digital signal processor (DSP), and so forth.

In some examples, chipset 780 may provide intercommunication among operating system(s) 710, network user device(s) 730, user I/O device(s) 740, storage 750, memory 760, CPU 770 or comms 790. For example, chipset 780 may provide intercommunication between operating system(s) 710, user I/O device(s) 740, storage 750 and CPU 770 to retrieve information from storage 750 to display graphics on a display included in user I/O device(s) 740. The graphics may have been rendered by CPU 770 at the request of an operating system included in operating system(s) 710.

In some examples, comms 790 may include logic and/or features to enable host device 700 to communicate externally with elements remote to host device 700. These logic and/or features may include communicating over wired, wireless or optical communication channels or links via one or more wired, wireless or optical networks. In communicating across such networks, comms 790 may operate in accordance with one or more applicable communication or networking standards in any version. Also, in some examples, comms 790 may be integrated with network I/O device(s) 730 in order to receive/forward data associated with communications to elements remote to host device 700.

As mentioned above, interface 754, may allow hardware and/or firmware elements of host device 700 to communicatively couple together. According to some examples, interface 754 may operate in accordance with one or more protocols or standards. These protocols or standards may be described in one or one or more industry standards (including progenies and variants) such as those associated with the Inter-Integrated Circuit (I²C) specification, the System Management Bus (SMBus) specification, the Accelerated Graphics Port (AGP) specification, the Peripheral Component Interconnect Express (PCI Express) specification, the Universal Serial Bus (USB), specification, the High-Definition Multimedia Interface (HDMI) standard, the Digital Visual Interface (DVI) specification, the Bluetooth™ specification, or the Serial Advanced Technology Attachment (SATA) specification. Although this disclosure is not limited to only the above-mentioned standards and associated protocols.

In some examples, host device 700 may be included in a computing device. Examples of a computing device may include, but is not limited to, physical end station, a server, a blade server, a computing board, a workstation, a desktop computer, a personal computer (PC) or a laptop computer, an ultra-mobile computer, and so forth.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples methods may be implemented that include receiving data at an input/output device coupled to a host device. The data may be associated with a virtual station interface maintained at the input/output device. The virtual station interface may be communicatively coupled to a virtual machine implemented at the host device. The data may have been sent from one of the virtual machine or a network element capable of being coupled to the input/output device via a network communication link. A switch identification may be assigned to the data based on an assigned port identifier for a port through which the data is received at the input/output device, identification information for the data, and an originator of at least a portion of the identification information. According to some examples, the assigned switch identification may be used as part of a lookup table to determine one or more actions for processing the data at the input/output device.

In some examples, implementation of this method may include the port through which the data is received including one of a physical port capable of being coupled to the network communication link or a logical port capable of being coupled to a data channel arranged to route data from the virtual machine to another virtual machine implemented at the host device.

According to some examples, implementation of this method may include the originator of at least the portion of the identification information to be identified as local based on the identification information for the data being generated at the input/output device or the data originator to be identified as global based on the identification information for the data being generated externally to the input/output device. For these examples, a local identification may be associated with a first identifier and a global identification may be associated with a second identifier. The assigned switch identification may include one of the first identifier or the second identifier based on whether the originator is identified as local or global.

In some examples, implementation of this method may include the originator of at least the portion of the identification information to be identified as local. For these examples, the identification information for the data may include a data channel identification number associated with the virtual station interface communicatively coupled to the virtual machine.

According to some examples, implementation of this method may include the originator of at least the portion of the identification information to be identified as local. For these examples the identification information for the data may include a default identification number generated at the input/output device based on the data being associated with control data. The control data may be related to establishing a data channel between the network element and the virtual machine. The data channel routed through the virtual station interface.

In some examples, implementation of this method may include operating the input/output device in compliance with one or more Ethernet specifications. The one or more Ethernet specification may include an Institute of Electrical and Electronics Engineers (IEEE) 802.1Qbg Ethernet specification or an IEEE 802.1BR Ethernet specification. For these examples, the originator of at least the portion of the identification information may be identified as global and the identification number may include one of a Service tag (S-tag) or a Bridge Port Extension tag (E-tag). The S-tag or the E-tag may be related to an established data channel between the network element and the virtual machine. The established data channel may be routed through the virtual station interface.

According to some examples, implementation of this method may include operating the I/O device in compliance with one or more Ethernet specifications. The one or more Ethernet specifications to include an Institute of Electrical and Electronics Engineers (IEEE) 802.1Qbg Ethernet specification or an IEEE 802.1BR Ethernet specification. For these examples, the originator of at least the portion of the identification information may be identified as local and the identification number to include one of a Service tag (S-tag) or a Bridge Port Extension tag (E-tag). The S-tag or the E-tag may be related to an established data channel between the virtual machine and the network element. The established data channel may be routed through the virtual station interface.

In some examples, implementation of this method may include storing information associated with multiple switches of the I/O device in a single switch identification table, the single switch identification table maintained in a memory at the input/output device. The information may include the assigned switch identification for the data.

In some examples, implementation of this method may include using the assigned switch identification as part of a lookup table comprises the lookup table to be stored in a memory at the input/output device, the memory arranged as ternary content-addressable memory (TCAM).

According to some examples, at least one machine readable medium comprising a plurality of instructions that in response to being executed on a computing device cause the computing device to carry out the example method as mentioned above.

In some examples an apparatus or device may include means for performing the example method as mentioned above.

According to some examples, an example apparatus or device may include a processor circuit and a memory unit communicatively coupled to the processor circuit. The memory unit may be arranged to store instructions for logic operative on the processor circuit. The logic may be configured to receive data at an input/output device capable of being coupled to a host device. The data may have a destination associated with a virtual station interface maintained at the input/output device. The virtual station interface may be capable of being coupled to a virtual machine implemented at the host device. The data may have been sent from one of the virtual machine or a network element capable of being coupled to the input/output device via a network communication link. The logic may have also been configured to assign a switch identification to the data based on an assigned port identifier through which the data is received at the input/output device, identification information for the data, and an originator of at least a portion of the identification information. For these examples, the logic may be configured to use the assigned switch identification as part of a lookup table in order to determine one or more actions for processing the data at the input/output device.

In some examples for the example device, the memory unit may include volatile memory.

In some examples for the example device, the port through which the data is received may include one of a physical port capable of being coupled to the network communication link or a logical port capable of being coupled to a data channel arranged to route data from the virtual machine to another virtual machine implemented at the host device.

According to some examples for the example device, the originator of at least the portion of the identification information may be be identified as local based on the identification information for the data being generated at the input/output device. The data originator may also be identified as global based on the identification information for the data being generated externally to the input/output device. A local identification may be associated with a first identifier and a global identification may be associated with a second identifier. The assigned switch identification may include one of the first identifier or the second identifier based on whether the originator is identified as local or global.

In some examples for the example device, the originator of at least the portion of the identification information may be identified as local. Also, the identification information for the data may include a data channel identification number associated with the virtual station interface capable of being coupled to the virtual machine.

According to some examples for the example device, the originator of at least the portion of the identification information may be identified as local. For these examples, the identification information for the data may include a default identification number generated at the input/output device based on the data being associated with control data. The control data may be related to establishing a data channel between the network element and the virtual machine through the virtual station interface.

In some examples for the example device, the input/output device may be arranged to operate in compliance with one or more Ethernet specifications to include an Institute of Electrical and Electronics Engineers (IEEE) 802.1Qbg Ethernet specification or an IEEE 802.1BR Ethernet specification. For these examples, the originator of at least the portion of the identification information may be identified as global. The identification number may include one of a Service tag (S-tag) or a Bridge Port Extension tag (E-tag). The S-tag or the E-tag may be related to an established data channel between the network element and the virtual machine. The data channel may be routed through the virtual station interface.

According to some examples for the example device, the input/output device may be arranged to operate in compliance with one or more Ethernet specifications to include an Institute of Electrical and Electronics Engineers (IEEE) 802.1Qbg Ethernet specification or an IEEE 802.1BR Ethernet specification. For these examples, the originator of at least the portion of the identification information may be identified as local and the identification number to include one of a Service tag (S-tag) or a Bridge Port Extension tag (E-tag). Also, the S-tag or the E-tag may be related to an established data channel between the virtual machine and the network element. The established data channel may be routed through the virtual station interface.

In some examples for the example device, the logic may also be configured to use the assigned switch identification as part of a lookup table stored in a memory at the input/output device. The memory may be arranged as ternary content-addressable memory (TCAM).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving data to be routed through a virtual station interface at an input/output device, the data sent from one of a virtual machine implemented at a host device coupled to the input/output device or a network element coupled to the input/output device via a network communication link;
assigning a switch identification to the data based, at least in part, on identification information for the data and an originator of at least a portion of the identification information; and
determining one or more actions for processing the data at the input/output device using the assigned switch identification with a lookup table maintained at the input/output device.

2. The method of claim 1, assigning the switch identification is also based, at least in part, on an assigned port identifier for a port through which the data is received at the input/output device.

3. The method of claim 2, the port through which the data is received to include one of a physical port capable of being coupled to the network communication link or a logical port capable of being coupled to a data channel arranged to route data from the virtual machine to another virtual machine implemented at the host device.

4. The method of claim 1, the originator of at least the portion of the identification information to be identified as local based on the identification information for the data being generated at the input/output device or the data originator to be identified as global based on the identification information for the data being generated externally to the input/output device, a local identification associated with a first identifier and a global identification associated with a second identifier, the assigned switch identification to include one of the first identifier or the second identifier based on whether the originator is identified as local or global.

5. The method of claim 1, the originator of at least the portion of the identification information to be identified as local and the identification information for the data to include a data channel identification number associated with the virtual station interface communicatively coupled to the virtual machine.

6. The method of claim 1, the originator of at least the portion of the identification information to be identified as local and the identification information for the data to include a default identification number generated at the input/output device based on the data being associated with control data related to establishing a data channel between the network element and the virtual machine, the data channel routed through the virtual station interface.

7. The method of claim 1, comprising operating the input/output device in compliance with one or more Ethernet specifications to include an Institute of Electrical and Electronics Engineers (IEEE) 802.1Qbg Ethernet specification or an IEEE 802.1BR Ethernet specification, the originator of at least the portion of the identification information to be identified as global and the identification number to include one of a Service tag (S-tag) or a Bridge Port Extension tag (E-tag).

8. The method of claim 7, the S-tag or the E-tag related to an established data channel between the network element and the virtual machine, the established data channel routed through the virtual station interface.

9. The method of claim 1, comprising operating the I/O device in compliance with one or more Ethernet specifications to include an Institute of Electrical and Electronics Engineers (IEEE) 802.1Qbg Ethernet specification or an IEEE 802.1BR Ethernet specification, the originator of at least the portion of the identification information to be identified as local and the identification number to include one of a Service tag (S-tag) or a Bridge Port Extension tag (E-tag).

10. The method of claim 9, the S-tag or the E-tag related to an established data channel between the virtual machine and the network element, the established data channel routed through the virtual station interface.

11. The method of claim 1, comprising storing information associated with multiple switches of the I/O device in a single switch identification table, the single switch identification table maintained in a memory at the input/output device.

12. The method of claim 11, comprising the information to include the assigned switch identification for the data.

13. The method of claim 1, the one or more actions for processing the data comprising cryptographic processing, packet/frame inspection processing or routing processing.

14. An apparatus comprising:
a processor circuit; and
a memory unit communicatively coupled to the processor circuit, the memory unit arranged to store instructions for logic operative on the processor circuit, the logic configured to receive data at an input/output device capable of being coupled to a host device, the data arranged to be routed through a virtual station interface maintained at the input/output device, the virtual station interface capable of being coupled to a virtual machine implemented at the host device, the data sent from one of the virtual machine or a network element capable of being coupled to the input/output device via a network communication link, the logic also configured to assign a switch identification to the data based, at least in part, on identification information for the data and an originator of at least a portion of the identification information, the logic configured to use the assigned switch identification as part of a lookup table in order to determine one or more actions for processing the data at the input/output device.

15. The apparatus of claim 14, comprising the memory unit to include volatile memory.

16. The apparatus of claim 14, the logic also configured to assign the switch identification to the data based, at least in part on an assigned port identifier for a port through which the data is received at the input/output device.

17. The apparatus of claim 16, the port through which the data is received to include one of a physical port capable of being coupled to the network communication link or a logical port capable of being coupled to a data channel arranged to route data from the virtual machine to another virtual machine implemented at the host device.

18. The apparatus of claim 14, the originator of at least the portion of the identification information to be identified as local based on the identification information for the data being generated at the input/output device or the data originator to be identified as global based on the identification information for the data being generated externally to the input/output device, a local identification associated with a first identifier and a global identification associated with a second identifier, the assigned switch identification to include one of the first identifier or the second identifier based on whether the originator is identified as local or global.

19. The apparatus of claim 18, comprising the originator of at least the portion of the identification information to be identified as local and the identification information for the data to include a data channel identification number associated with the virtual station interface capable of being coupled to the virtual machine.

20. The apparatus of claim 18, comprising the originator of at least the portion of the identification information to be identified as local and the identification information for the data to include a default identification number generated at the input/output device based on the data being associated with control data related to establishing a data channel between the network element and the virtual machine, the data channel routed through the virtual station interface.

21. The apparatus of claim 14, the input/output device arranged to operate in compliance with one or more Ethernet specifications to include an Institute of Electrical and Electronics Engineers (IEEE) 802.1Qbg Ethernet specification or an IEEE 802.1BR Ethernet specification, the originator of at least the portion of the identification information to be identified as global and the identification number to include one of a Service tag (S-tag) or a Bridge Port Extension tag (E-tag).

22. The apparatus of claim 21, the S-tag or the E-tag related to an established data channel between the network element and the virtual machine, the data channel routed through the virtual station interface.

23. The apparatus of claim 14, the input/output device arranged to operate in compliance with one or more Ethernet specifications to include an Institute of Electrical and Electronics Engineers (IEEE) 802.1Qbg Ethernet specification or an IEEE 802.1BR Ethernet specification, the originator of at least the portion of the identification information to be identified as local and the identification number to include one of a Service tag (S-tag) or a Bridge Port Extension tag (E-tag).

24. The apparatus of claim 22, the S-tag or the E-tag related to an established data channel between the virtual machine and the network element, the established data channel routed through the virtual station interface.

25. The apparatus of claim 14, comprising the logic also configured to use the assigned switch identification as part of a lookup table stored in a memory at the input/output device, the memory arranged as ternary content-addressable memory (TCAM).

26. At least one non-transitory machine readable medium comprising a plurality of instructions that in response to being executed by a system cause the system to:
   receive data to be routed through a virtual station interface at an input/output device, the data sent from one of a virtual machine implemented at a host device coupled to the input/output device or a network element coupled to the input/output device via a network communication link;
   assign a switch identification to the data based, at least in part, on identification information for the data and an originator of at least a portion of the identification information; and
   determine one or more actions for processing the data at the input/output device using the assigned switch identification with a lookup table maintained at the input/output device.

27. The least one non-transitory machine readable medium of claim 26, the system to assign the switch identification comprises the instructions to also cause the system to assign the switch identification based, at least in part, on an assigned port identifier for a port through which the data is received at the input/output device.

28. The least one non-transitory machine readable medium of claim 27, the port through which the data is received to include one of a physical port capable of being coupled to the network communication link or a logical port capable of being coupled to a data channel arranged to route data from the virtual machine to another virtual machine implemented at the host device.

29. The least one non-transitory machine readable medium of claim 26, the originator of at least the portion of the identification information to be identified as local based on the identification information for the data being generated at the input/output device or the data originator to be identified as global based on the identification information for the data being generated externally to the input/output device, a local identification associated with a first identifier and a global identification associated with a second identifier, the assigned switch identification to include one of the first identifier or the second identifier based on whether the originator is identified as local or global.

30. The least one non-transitory machine readable medium of claim 26, the originator of at least the portion of the identification information to be identified as local and the identification information for the data to include a data channel identification number associated with the virtual station interface communicatively coupled to the virtual machine.

31. The least one non-transitory machine readable medium of claim 26, the originator of at least the portion of the identification information to be identified as local and the identification information for the data to include a default identification number generated at the input/output device based on the data being associated with control data related to establishing a data channel between the network element and the virtual machine, the data channel routed through the virtual station interface.

32. The least one non-transitory machine readable medium of claim 26, comprising storing information associated with multiple switches of the I/O device in a single switch identification table, the single switch identification table maintained in a memory at the input/output device.

33. The least one non-transitory machine readable medium of claim 32, comprising the information to include the assigned switch identification for the data.

34. The least one non-transitory machine readable medium of claim 26, the one or more actions for processing the data comprising cryptographic processing, packet/frame inspection processing or routing processing.

* * * * *